United States Patent
Griffith et al.

(10) Patent No.: US 7,522,407 B2
(45) Date of Patent: Apr. 21, 2009

(54) SYSTEM AND METHOD FOR FACILITATING ENGAGING COMPUTER WITH DOCK

(75) Inventors: Matthew Brent Griffith, Raleigh, NC (US); Michael Scott Mettler, Durham, NC (US); Masahiko Nagai, Cary, NC (US); Scott David Ruppert, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 385 days.

(21) Appl. No.: 11/385,122

(22) Filed: Mar. 21, 2006

(65) Prior Publication Data

US 2007/0223190 A1    Sep. 27, 2007

(51) Int. Cl.
G06F 1/16    (2006.01)
G06F 13/00    (2006.01)

(52) U.S. Cl. .............. 361/679.41; 710/303; 710/304
(58) Field of Classification Search ............... 361/686, 361/724–727, 679–685; 710/303, 304; 439/352, 439/353, 357, 358
See application file for complete search history.

(56) References Cited

U.S. PATENT DOCUMENTS

| | | | |
|---|---|---|---|
| 5,313,596 A | 5/1994 | Swindler et al. ............ 710/303 |
| 5,751,546 A | 5/1998 | Clark et al. ................. 361/686 |
| 5,818,691 A | 10/1998 | McMahan et al. ........... 361/686 |
| 6,034,869 A | 3/2000 | Lin ............................. 361/686 |
| 6,142,593 A | 11/2000 | Kim et al. ................ 312/223.2 |
| 6,264,488 B1 | 7/2001 | Helot et al. ................. 439/341 |
| 6,297,953 B1 * | 10/2001 | Helot ......................... 361/686 |
| 6,411,537 B2 | 6/2002 | Helot ......................... 361/683 |
| 6,418,013 B1 * | 7/2002 | Broder et al. ............... 361/686 |
| 6,560,101 B1 | 5/2003 | Oross et al. ................. 361/686 |
| 6,570,758 B1 | 5/2003 | Maeda ....................... 361/686 |
| 6,667,881 B2 | 12/2003 | Oross et al. ................. 361/686 |
| 6,697,252 B2 | 2/2004 | Maeda ....................... 361/686 |
| 6,912,125 B2 | 6/2005 | Weng ......................... 361/686 |
| 6,944,016 B2 | 9/2005 | Chen et al. .................. 361/685 |
| 2002/0008959 A1 | 1/2002 | Helot ......................... 361/683 |
| 2003/0147209 A1 * | 8/2003 | Oross et al. ................. 361/686 |
| 2003/0161096 A1 | 8/2003 | Yin ............................ 361/683 |
| 2003/0202323 A1 | 10/2003 | Maeda ....................... 361/686 |
| 2003/0231465 A1 | 12/2003 | Weng ......................... 361/686 |
| 2005/0168937 A1 * | 8/2005 | Yin et al. .................... 361/686 |

* cited by examiner

*Primary Examiner*—Jayprakash N Gandhi
*Assistant Examiner*—Nidhi Desai
(74) *Attorney, Agent, or Firm*—John L. Rogitz

(57) ABSTRACT

Two male guides protrude up from a dock and the bottom of a portable computer is formed with parallel female channels configured to receive the guides in a drop-down docking configuration. Accordingly, a user can slide the portable computer side-to-side across the male guides until the guides are tactiley detected by the user to be in the channels. The user then slides the portable computer back until the computer connector drops into engagement with the dock connector.

12 Claims, 1 Drawing Sheet alternate embodiment

SYSTEM AND METHOD FOR FACILITATING ENGAGING COMPUTER WITH DOCK

FIELD OF THE INVENTION

The present invention relates generally to systems and methods for facilitating engagement of a portable computer with a dock.

BACKGROUND OF THE INVENTION

Docking stations (or "docks") have been developed for portable computers that facilitate connecting the portable computers to peripherals components. For instance, a dock provides convenient connections for a portable computer at a generally fixed location (e.g., office, home, automobile, hotel, airplane, etc.) and typically is connected to a wide variety of devices, such as mice, printers, keyboards, displays, network cables, telephone cables, speakers, AC power adapters, security locks, additional media drives, etc. Once the portable computer is docked with the docking station, it can access the device(s) the docking station is connected to without making additional connections. It will readily be appreciated that when a portable computer is connected to a docking station, the benefits of a desktop system are afforded to the user while maintaining the flexibility the user has to take the portable computer with him on the road.

As recognized herein, users of portable computer systems can experience difficulty attaching the portable computers to a docking station (dock) or port replicator. Furthermore, recent portable computer designs have required the docking connector be on the bottom of the computer rather than on the rear, complicating docking even more by requiring a more difficult "drop-down" action rather than the user-preferred "slide-in" action when docking the computer. Despite the addition of various visual cues, many users still find it difficult to navigate this "drop-down" action. Misalignment when docking can cause damage to the docking connector (on both the computer and the dock) and can frustrate the user.

As understood herein, providing visual cues or guide rails/slots on the dock are less than optimum solutions. With more specificity, visual cues can be difficult to implement and often are difficult and frustrating for the user to employ. Indeed, if the user has a monitor stand or other desktop obstacles, he may not be able to use any visual cues at all. With respect to guide rails or slots on the dock, as understood herein such dock structure limits that dock to accepting only a particular size of computer, when a flexible solution is preferred so that various portable computers of various sizes can use a common dock.

SUMMARY OF THE INVENTION

A system includes a dock formed with a dock surface and two male guides protruding upwardly from the dock surface. A dock connector is also exposed on the dock surface. A portable computer is formed with a rest surface configured to rest on the dock surface of the dock. A computer connector is exposed on the rest surface and is configured complementarily to the dock connector. In accordance with present principles, two elongated female channels are formed on the rest surface of the computer, with each channel being configured for engaging a respective male guide. With this combination of structure, a user can slide the portable computer side-to-side across the male guides until the male guides are tactiley detected by the user to be in the channels, and then the user slides the portable computer toward the dock with the guides riding in the channels until the computer connector drops into engagement with the dock connector.

The male guides may be formed as posts and may be are made of soft plastic or rubber. Or, the guides may be formed as elongated rails. Preferably, the distance between the channels is substantially equal to the distance between the male guides, and likewise the width of each channel is substantially equal to the diameter of each male guide. Each channel may extend from an edge of the rest surface and may terminate in a respective hole that is configured to receive a respective male guide therein when the dock connector is engaged with the computer connector.

In another aspect, a portable computer includes a rest surface and a computer connector exposed on the rest surface. Two elongated female channels are formed on the rest surface parallel to each other.

In still another aspect, a computer system includes a dock and a portable computer configured for drop-down electrical engagement with the dock. Means are provided for allowing a user to slide the portable computer side-to-side across the dock until mechanical engagement is felt by the user, with the user then being able to slide the portable computer toward the dock until the portable computer drops into electrical engagement with the dock.

The details of the present invention, both as to its structure and operation, can best be understood in reference to the accompanying drawings, in which like reference numerals refer to like parts, and in which:

BRIEF DESCRIPTION OF THE DRAWINGS

FIG. 2A is an elevational view of a channel showing a deeper hole; and

DETAILED DESCRIPTION OF THE PREFERRED EMBODIMENT

Figure 1:
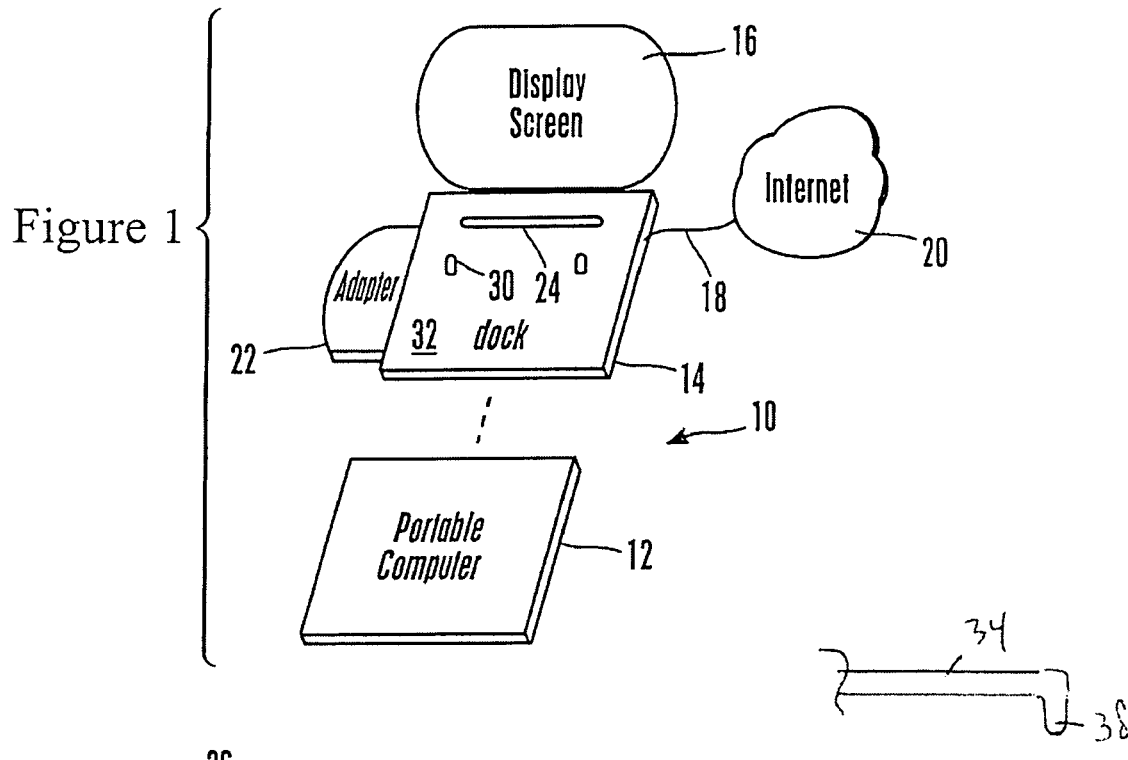
FIG. 1 is a perspective view of the dock and portable computer in an exploded relationship.

Referring initially to FIG. 1, a system is shown, generally designated 10, that includes a portable computer 12 such as a laptop or notebook computer that can engage a dock 14 in accordance with computer docking principles known in the art. Accordingly, the dock 14 may include, without limitation, peripherals such as a display screen 16, a connection 18 to the Internet 20, and an adaptor 22, all of which can communicate with the computer 12 when the computer 12 is properly docked with its below-discussed computer connector engaged with a dock connector 24 of the dock 14 to afford the user the advantages normally afforded by a full desktop computer system.

Figure 2:
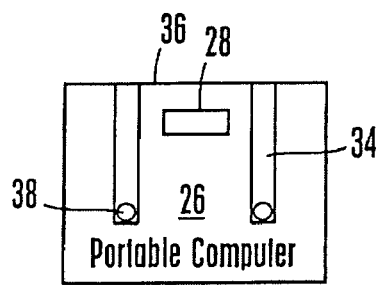
FIG. 2 is a bottom view of the portable computer.

Specifically and now referring to FIG. 2, the bottom surface 26 of the computer 12 includes a connector 28 that is configured for engaging the connector 24 of the dock 14 in a drop-down engagement. In accordance with the present invention and in cross-reference to FIGS. 1 and 2, the dock 14 is also formed with two male guides 30 that protrude upwardly from the surface 32 of the dock 14 on which the bottom surface 26 of the computer 12 rests when docked. In the non-limiting embodiment shown, the guides 30 are configured as posts with rounded tops, and preferably are made of soft plastic or rubber to minimize the risk of damage during docking.

In contrast, the bottom surface 26 of the computer 12 is formed with two parallel elongated female channels 34 that essentially are indentations into the bottom surface 26. It is preferred that the distance between the channels 34 is substantially equal to the distance between the guides 30 and that the width of each channel 34 is substantially equal to the diameter of the guide 30 it is intended to engage.

Accordingly, with the above structure in mind it may now be appreciated that a user can slide the portable computer 12 side-to-side across the male guides 30 until the guides 30 are tactiley detected by the user to be in the channels 34 (as indicated by, e.g., the computer dropping slightly and suddenly toward the dock 14). The user then slides the portable computer 12 back toward the display screen 16 of the dock 14 with the guides 30 of the dock 14 riding in the channels 34 of the portable computer 12 until the computer connector 28 drops into engagement with the dock connector 24, providing a simple, easy, accurate, and flexible docking solution that can be implemented on portable computers of various sizes while requiring minimal changes to our existing dock designs.

It is to be understood that the channels 34 need not be very deep, but instead need only be deep enough to allow the user to tactilely detect when the computer 12 is properly aligned. In the embodiment shown in FIG. 2, each channel 34 can extend from an edge 36 of the bottom surface 26 and can terminate in a respective hole 38 that is deeper than the remainder of the channel as shown in FIG. 2A, with the distances and angles between the holes 38 and computer connector 28 equalling those between the male guides 30 and the dock connector 24 so that the male guides 30 are firmly disposed in the holes 38 when the computer and dock connectors are electrically engaged.

Figure 3:
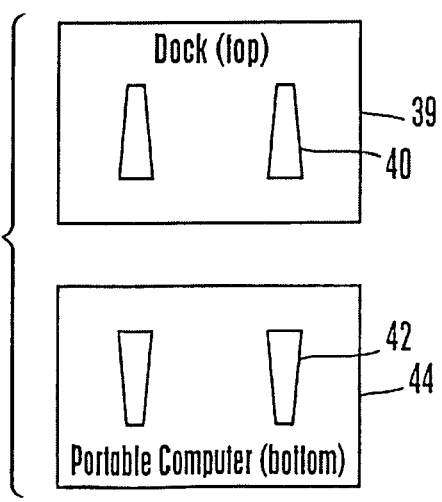
FIG. 3 is a plan view showing the top of an alternate dock with only the guides visible for clarity and showing the bottom of an alternate portable computer with only the channels showing for clarity.

FIG. 3 shows an alternate dock 39 in which the male guides are not configured as posts but rather as elongated upwardly-protruding rails 40 that fit within complementarily-shaped female channels 42 on a portable computer 44. If desired, both the rails 40 and channels 42 can flare out as shown, i.e., both the rails and channels can become wider at one end to improve the tactile performance of the docking operation.

While the particular SYSTEM AND METHOD FOR FACILITATING ENGAGING COMPUTER WITH DOCK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A system, comprising:
    a dock formed with a dock surface and at least two male guides protruding upwardly from the dock surface, a dock connector also being exposed on the dock surface; and
    a portable computer formed with a rest surface configured to rest on the dock surface of the dock, a computer connector being exposed on the rest surface and being configured complementarily to the dock connector, at least two elongated female channels being formed on the rest surface with each channel being configured for engaging a respective male guide, wherein a user can slide the portable computer side-to-side across the male guides until the male guides are tactiley detected by the user to be in the channels, the user then being able to slide the portable computer toward the dock until the computer connector drops into engagement with the dock connector, the male guides being formed with round tops and no dimension of elongation in a dimension of elongation defined by the female channels, wherein each channel extends from an edge of the rest surface and terminates in a respective hole configured to receive a respective male guide therein when the dock connector is engaged with the computer connector, a respective hole being deeper than its respective channel.

2. The system of claim 1, wherein the male guides are formed as posts.

3. The system of claim 1, wherein the male guides are made of plastic or rubber.

4. The system of claim 1, wherein the distance between the channels is substantially equal to the distance between the male guides.

5. The system of claim 1, wherein the width of each channel is substantially equal to the diameter of each male guide.

6. A portable computer, comprising:
    a bottom surface;
    a computer connector exposed on the bottom surface, the computer connector being configured for engaging a connector of a dock in a drop-down engagement, the dock being formed with male guides that protrude upwardly from a surface of the dock on which the bottom surface of the computer rests when docked, the guides being configured as posts and being made of material to minimize risk of damage during docking, the bottom surface of the computer being formed with two parallel elongated female channels, each channel extends from an edge of the bottom surface and terminates in a respective hole that is deeper than the respective channel, a distance between the channels being substantially equal to a distance between the guides, a width of each channel being substantially equal to a diameter of a guide,
    wherein a user can slide the computer side-to-side across the male guides until the guides are tactiley detected by the user to be in the channels, the user then being able to slide the portable computer back toward a display screen of the dock with the guides of the dock riding in the channels of the portable computer until the computer connector drops into engagement with the dock connector.

7. The computer of claim 6, wherein the channels flare out from one end to another.

8. A computer system, comprising:
    a dock;
    a portable computer configured for drop-down electrical engagement with the dock; and
    means for allowing a user to slide the portable computer side-to-side across the dock until mechanical engagement is felt by the user, the user then being able to slide the portable computer toward the dock until the portable computer drops into electrical engagement with the dock, wherein the means for allowing includes at least two male guides formed on a dock surface of the dock and at least two elongated channels formed on a rest surface of the computer, the male guides being round and thus not being elongated in a dimension of elongation defined by the channels;

wherein each channel extends from an edge of the rest surface and terminates in a respective hole configured to receive a respective male guide therein when a dock connector on the dock surface is engaged with a computer connector on the computer, a respective hole being deeper than its respective channel.

9. The system of claim 8, wherein the male guides are formed as posts.

10. The system of claim 9, wherein the male guides are made of plastic or rubber.

11. The system of claim 10, wherein the distance between the channels is substantially equal to the distance between the male guides.

12. The system of claim 11, wherein the width of each channel is substantially equal to the diameter of each male guide.

* * * * *